March 25, 1930.  H. LUND  1,752,097
INDUCTION MOTOR
Filed March 6, 1925
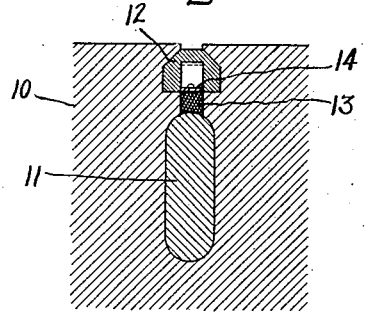
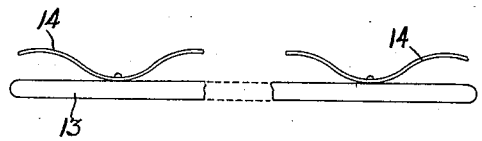
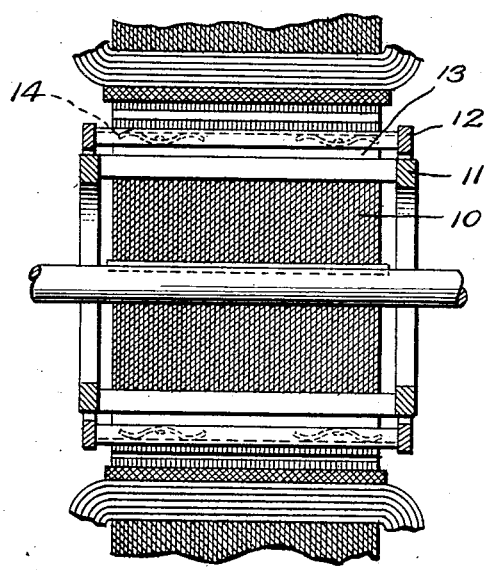
Inventor:
Hans Lund,
by Alexander S. Lund
His Attorney.

Patented Mar. 25, 1930

1,752,097

UNITED STATES PATENT OFFICE

HANS LUND, OF BERLIN-SCHONEBERG, GERMANY, ASSIGNOR TO GENERAL ELECTRIC COMPANY, A CORPORATION OF NEW YORK

INDUCTION MOTOR

Application filed March 6, 1925, Serial No. 13,571, and in Germany July 29, 1924.

My invention relates to automatic means for varying the characteristics of dynamo electric machines. The invention is applicable to motors of the squirrel cage type and in particular to double squirrel cage induction motors and the invention will be described in connection with means for improving the performance of this type of motor.

In a double or multiple squirrel cage induction motor, it is the usual practice to provide a high resistance winding used primarily for starting and one or more lower resistance windings used primarily for efficient running operation. The selective action of the windings during starting and running conditions is generally brought about by placing the high resistance winding near the periphery of the rotor iron where it has low reactance and placing the low resistance winding well beneath the periphery of the iron so that it will have a high reactance. The reactance effect varies with the secondary frequency; thus at the instant of starting the secondary frequency is a maximum and the high frequency flux penetrates the rotor iron to only a limited extent, thereby causing most of the starting action to be performed by the high resistance winding. As the motor speeds up, the secondary frequency decreases, more flux threads the low resistance winding and causes that winding to become more effective as the speed increases. In some cases it is desirable to increase this selective action of the two windings of such a motor. In other words, it is sometimes desirable to increase the starting action performed by the high resistance winding as compared to its action during running conditions, and my invention relates to means for bringing this about.

In carrying my invention into effect, I vary the reluctance of the magnetic circuits between the two windings in such a way as to cause the reluctance of this path to increase as the motor comes up to speed. This assists the natural selective action of the flux distribution due to variation in frequency and more clearly defines the starting and running functions of the two windings. Consequently, those windings may be more efficiently designed to perform these more specific functions.

The features of my invention which are believed to be novel and patentable will be pointed out in the claims appended hereto. For a better understanding of my invention, reference is made in the following description to the accompanying drawing in which Fig. 1 represents a cross section taken through the rotor windings of a preferred embodiment of my invention; Fig. 2 represents a view of the automatic reluctance varying means used in the arrangement of Fig. 1; and Fig. 3 represents a fragmentary longitudinal section of the motor showing the complete rotor inside a portion of the stator.

Referring to the drawing, 10 represents a section of the laminated iron of the secondary magnetic circuit of a double squirrel cage induction motor taken at right angles to the squirrel cage bars. 11 represents a bar of the low resistance high reactance winding, and 12, a bar of the high resistance low reactance winding.

In accordance with the usual practice, the high resistance bar 12 is placed near the periphery of the secondary core and the low resistance bar 11 is buried well beneath the surface. The high resistance bar 12 is made in the inverted U-shape shown to accommodate the automatic reluctance varying means represented in Fig. 2. This particular device consists of a bar 13 of magnetic material of high permeability of such dimensions as to loosely fit the slot space between the two windings 11 and 12, and one or more springs 14 which serve to press the magnetic wedge 13 down against the lower bar 11 when the motor is at rest. The spring or springs loosely fit into the U-shaped channel of the high resistance bar and their outer ends find a bearing surface on the bottom surface of the U-shaped channel.

It will now appear that when the secondary rotor member is rotated at high speed, the wedge 13 will be urged toward the periphery of the rotor by centrifugal force. The springs 14 will be compressed and the wedge 13 will enter the U-shaped channel in the high resistance bar. When the motor is stationary, the wedge 13 will serve to substantially bridge the air gap between the two squirrel cage windings and the high frequency starting flux will cross this bridge threading only the high resistance starting winding. As the motor speeds up, this bridge will gradually be opened, due to the entrance of the wedge in the cavity of the high resistance bar. Consequently, at high operating speeds, when the flux is of comparatively low frequency, it will pass beneath the low resistance bar 11 causing the low resistance winding 11 to be highly effective and correspondingly decreasing the relative effect of the high resistance bar 12.

It will be evident that the selective effect of frequency variation at different rotor speeds is materially assisted by this change in the reluctance of the flux path between the two windings. The two effects are accumulative and vary with the speed of rotation. It will therefore be feasible to make the winding 12 of a higher resistance and the winding 11 of a lower resistance than usual with corresponding better starting and running characteristics. It will also be seen that the shape of the high resistance bar is favorable for rapid and efficient heat dissipation.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

1. A rotor element for a dynamo electric machine comprising a core member and a pair of windings carried by said core at different fixed radial positions therein, and means dependent upon the speed of rotation of said element for varying the reluctance of the flux path between said windings.

2. A rotor element for a dynamo electric machine comprising a core member and a pair of windings of materially different resistance located at different fixed radial positions in said core and automatic means for varying the reluctance of the flux path between said windings.

3. A secondary rotor element for an induction machine comprising a magnetic core, a high resistance low reactance winding and a low resistance high reactance winding immovably fixed in said core, and means dependent upon the speed of rotation of said rotor element for varying the magnetic reluctance of the flux path between said windings.

4. A secondary rotor element for an induction machine comprising a core member and a pair of squirrel cage windings carried at different radial positions in said core member, a radially movable magnetic bridge in said rotor for varying the distribution of the flux threading said windings, and means dependent upon the speed of rotation of said rotor element for moving said bridge.

5. A secondary rotor element for an induction machine comprising a core member, a pair of squirrel cage windings carried at different radial positions in said core, a movable magnetic bridge forming a portion of a substantially closed magnetic circuit between said windings, said magnetic bridge being directly subjected to centrifugal force and movable thereby to open said magnetic circuit.

6. A secondary rotor element for an induction machine comprising a slotted core member, a high resistance squirrel cage winding in the top of said slots, a low resistance squirrel cage winding in the bottom of said slots, movable magnetic bridge members between said windings in said slots, and means dependent upon the speed of rotation for moving said bridge members in a radial direction to vary the rotor flux distribution between said windings.

7. In a secondary rotor element of an alternating current dynamo electric machine having a magnetic core, a squirrel cage winding having bars of an inverted U-shape in said core, radially movable magnetic members bridging flux paths beneath said bars, said members being arranged to move outward by centrifugal force into the openings in said U-shaped bars to increase the reluctance of the flux path beneath said winding.

8. In a secondary member for induction machines, a squirrel cage winding having U-shaped bars, movable magnetic wedges loosely fitting into the openings of said U-shaped bars, and means for moving said wedges in and out of said openings to vary the characteristics of said secondary.

9. A rotor element for a dynamo electric machine comprising a core member and a pair of windings carried by said core at different fixed radial positions therein and means contained within said core member and dependent upon the speed of rotation thereof for varying the reluctance of the flux path between said windings.

10. In an induction motor squirrel cage secondary rotor member, a core provided with slots, a squirrel cage winding fixed in said slots, movable magnetic members in said slots above said squirrel cage winding, and means self-contained within said rotor for varying the radial position of said magnetic members in said slots in response to the speed of rotation of said rotor member.

11. A rotor element for a dynamo electric machine comprising a core member, a pair of windings carried by said core at different radial positions therein, and a movable magnetic member contained within said core member directly subjected to centrifugal force and movable thereby to vary the reluctance of the flux path between said windings.

12. A rotor element for a dynamo electric machine comprising a core member, a pair of windings carried by said core at different fixed radial positions therein, and a radially movable magnetic member contained within said core member and dependent upon the speed of rotation thereof for varying the reluctance of the flux path between said windings.

13. In a dynamo-electric machine, the combination of a stator having a bore; a primary winding on said stator; a rotor free to rotate in said bore; secondary windings on said rotor; and members formed of material of magnetic permeability radially movably mounted so as to vary the linking path between said windings on said rotor and stator.

14. In a dynamo-electric machine, the combination of a stator having a bore; a primary winding on said stator; a rotor free to rotate in said bore; secondary windings placed in slots formed near the periphery of said rotor; and members formed of material of high magnetic permeability placed in said slots parallel with the portions of said secondary windings carried in said slots, said members fitting in said slots near said secondary windings, but being so shaped as to be thrown towards the periphery of the rotor by the centrifugal force of the rotor, said slots being so shaped that the magnetic reluctance of a flux path across any of said slots through the member in said slot is greater with the member in its outer position near the periphery than in its inner position near the coil.

15. In a dynamo-electric machine, the combination of a stator having a bore; a primary winding on said stator; a rotor free to rotate in said bore; secondary windings placed in slots formed near the periphery of said rotor; members formed of material of high magnetic permeability placed in said slots parallel with the portions of said secondary windings carried in said slots, said members fitting in said slots near said secondary windings, but being so shaped as to be thrown towards the periphery of the rotor by the centrifugal force of the rotor, said slots being so shaped that the magnetic reluctance of a flux path across any of said slots through the member in said slot is greater with the member in its outer position near the periphery than in its inner position near the coil, and elastic means for forcing said members into the bottom of said slots adjacent to said secondary windings when said rotor is at rest.

16. In an induction motor, the combination of a stator; a rotor; windings on said stator and rotor; and radially movable members formed of material of high magnetic permeability so placed as to vary the linking paths between the stator and rotor windings and thus vary the reactance of the motor.

17. In a dynamo-electric machine, the combination of a stator having a bore; a primary winding on said stator; a rotor free to rotate in said bore, there being slots provided in the peripheral portion of said rotor; a high resistance secondary winding disposed in said slots; a low resistance secondary winding disposed in said slots in spaced relation to said high resistance secondary winding; and magnetically permeable members disposed in said slots and shiftable from proximity to one of said secondary windings to proximity with the other of said secondary windings.

18. In an induction motor, the combination of a stator; a rotor; and radially movable means for varying the reactance of the motor by varying the magnetic reluctance of the leakage paths in the periphery of the rotor.

19. In a dynamo-electric machine, the combination of a stator having a bore; a primary winding on said stator; a rotor free to rotate in said bore; a secondary winding placed in slots formed near the periphery of the rotor; and members formed of magnetic material placed in said slots between the periphery of said rotor and said secondary winding, said members being movable to vary the magnetic reluctance of the leakage path across said slots while disposed substantially entirely within said slots.

20. A secondary member for an induction motor, having a squirrel cage winding including U-shaped conductor bars, and members of magnetic material substantially fitting the slots in said bars, and movable radially in and out thereof to vary the characteristics of said winding.

21. In a dynamo-electric machine, the combination of: a stator having a bore; a primary winding on said stator; a rotor free to rotate in said bore; secondary windings placed in slots formed near the periphery of said rotor; and members formed of material of high magnetic permeability placed in said slots parallel with the portions of said secondary windings carried in said slots, said members fitting in said slots near said secondary windings, said members being adapted to be shifted radially in said slots into a position of greater reluctance for the leakage paths of the rotor.

22. In a dynamo-electric machine, the combination of: a stator having a bore; a primary winding on said stator; a rotor free to rotate in said bore; a secondary winding on said rotor; members formed of material of magnetic permeability radially movably mounted so as to vary the magnetic reluctance of the leakage path between said windings on said rotor and stator; and means for holding said members near said secondary winding when said rotor is at rest.

23. In a dynamo-electric machine, the combination of: a stator having a bore; a primary winding on said stator; a rotor free to rotate in said bore; secondary windings provided upon said rotor in spaced relation to each other; and a magnetically permeable member carried by said rotor so as to be shiftable away from one of said secondary windings and towards the other of said secondary windings.

24. In an induction motor, the combination of: a stator; a rotor; and radially movable means automatically varying the reactance of the motor by varying the magnetic reluctance of the leakage paths in the periphery of the rotor as the speed of this rotor increases.

25. In the rotor of a dynamo-electric machine, the combination of: a rotatable body of high magnetic permeability having a slot therein; a winding adjacent said slot; means for inducing a current in said winding, at least a portion of the flux produced following a flux path through said body around said winding and transversing said slot; and a member of high magnetic permeability radially movable in said slot to vary the reluctance of said flux path.

In witness whereof, I have hereunto set my hand this 13th day of February, 1925.

HANS LUND.